Aug. 15, 1933.   W. B. WINGERT   1,922,186
MANUFACTURE OF DIRECT AMMONIUM SULPHATE
Filed Jan. 24, 1929
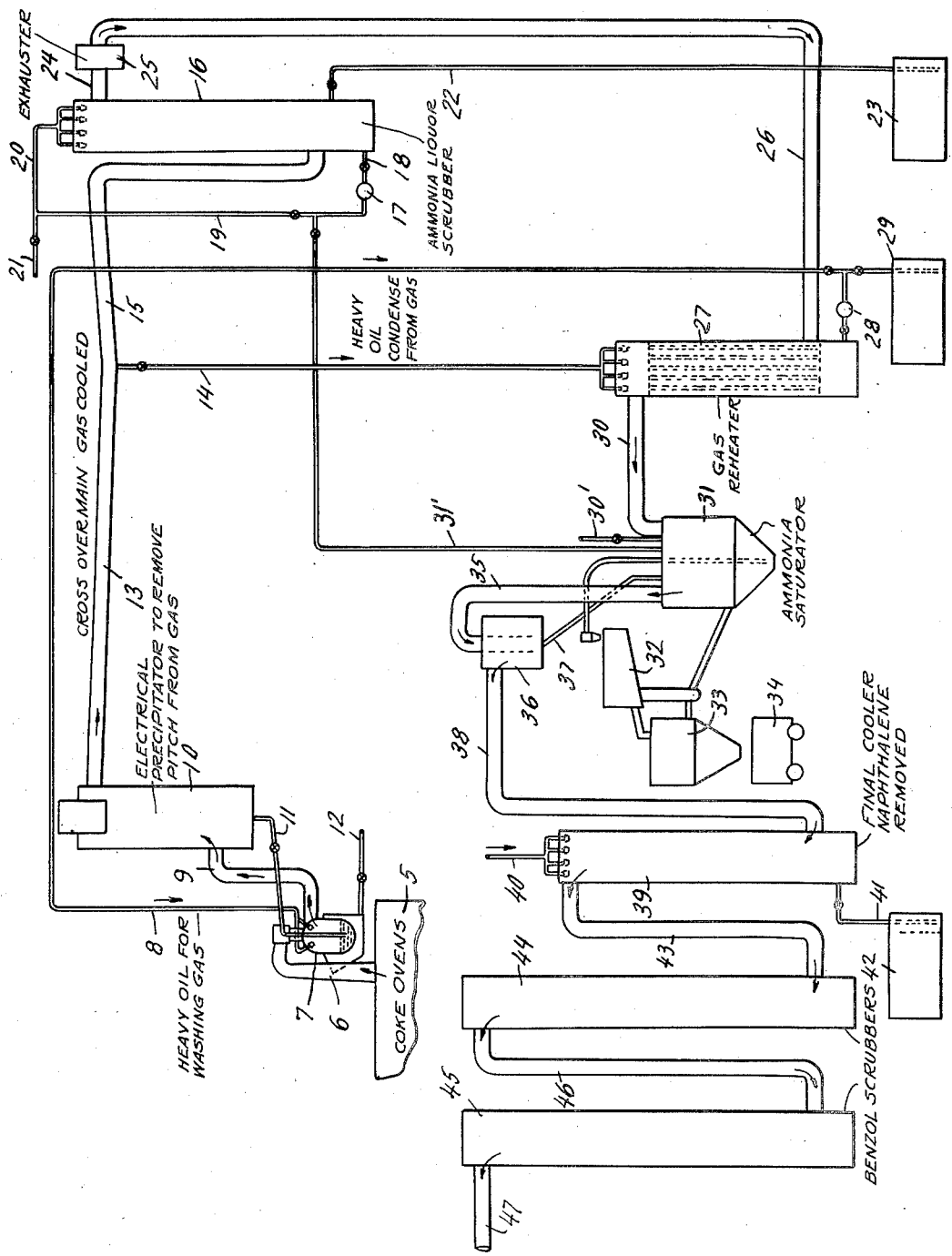
INVENTOR
William B. Wingert
BY Forbes Silsby
ATTORNEY Patented Aug. 15, 1933

1,922,186

UNITED STATES PATENT OFFICE 1,922,186

MANUFACTURE OF DIRECT AMMONIUM SULPHATE

William B. Wingert, Detroit, Mich., assignor to Semet-Solvay Company, New York, N. Y., a Corporation of New York Application January 24, 1929. Serial No. 334,752

2 Claims. (Cl. 23—196)

This invention relates to coal distillation and more particularly to the recovery of ammonium sulphate from gases derived from the distillation of coal.

In the recovery of ammonium sulphate from coal distillation gases heretofore, it has been the practice to recover weak ammonia liquor in the condensers and to distill the ammonia liquor so that the ammonia recovered therein could be conveyed to the saturators and there fixed as ammonium sulphate. The operation as described entails numerous difficulties and involves considerable additional expense.

It is the object of the present invention to provide a simple and effective method and apparatus permitting the direct recovery of ammonium sulphate from coal distillation gases, and to avoid thereby the difficulties experienced heretofore.

In carrying out the invention, the coal distillation gases derived, for example, from a coke oven, are subjected to sufficient cooling and preferably to electrical precipitation to effect the separation of the heavy pitch constituents. Thereafter the gases are further cooled, for example by radiation, so that the heavy oil is condensed. The gas is thus freed from heavy pitch and oil constituents and being at a relatively low temperature, the gas is subjected in a primary condenser to contact with a circulating body of ammonia liquor, with the addition of sufficient water to make up the loss due to evaporation in the condenser. A relatively concentrated ammonia liquor is thus produced. At the same time, carbolic oil is condensed and is separated from the ammonia liquor and withdrawn.

The gases are then conveyed to a reheater wherein their temperature is raised by indirect contact with the heavy oil previously separated therefrom, and at this higher temperature the gases are delivered to the saturator together with the strong ammonia liquor recovered from the condenser and a regulated quantity of sulphuric acid. In the saturator ammonium sulphate is produced directly and may be recovered. The gases pass then through an acid separator into a final cooler where they are cooled with water. The water is delivered to a decanter in which naphthalene is recovered, and the gases are conveyed to a benzol scrubber in which they are freed from final traces of condensible constituents. The gases may be delivered then to a gasometer or other storage receptacle and are adapted for use as fuel or otherwise.

The heavy oil, after passing through the reheater and being cooled therein, may be returned and utilized as an initial cooling agent for the gases leaving the coke ovens. The surplus of this heavy oil may be accumulated in any suitable receptacle and employed for purposes for which it is adapted.

While the invention as described is adapted especially for the treatment of gases from coke ovens, it may be utilized in connection with coal distillation gases from other sources such as gas retorts and water gas sets. It permits the direct recovery of ammonium sulphate, avoids the ammonia still and the necessity for employing steam to supply heat thereto. It requires a minimum of simple and relatively inexpensive apparatus, is readily controlled, and is thus capable of producing ammonium sulphate in an economical and satisfactory manner.

To effect the initial separation of the heavy pitch from the gases, it may be sufficient to apply the heavy oil as a cooling agent in the collector main of the coke oven battery. Preferably, however, an electrical precipitator, for example the well-known Cottrell precipitator, is utilized to remove the pitch from the gases. The precipitator should be disposed preferably closely adjacent to the collector main, and the gases carrying the pitch constituents should be delivered directly thereto. These gases may be cooled preliminarily in the collector main by means of the heavy oil, and the temperature may be regulated so as to cause the separation of the desired pitch constituents in the precipitator.

The operation of an electrical precipitator as commonly used consists in passing the gas to be treated between electrodes whose difference in electrical potential is very great. Experience has shown that it is best to use a rectified alternating current. The alternating current (the primary) is sent through a step-up transformer to produce the high potential current (the secondary) which is then rectified to an intermittent uni-directional current, for example by means of a rotary converter. The rectified current is delivered from the converter to the electrical precipitator at practically the potential at which it leaves the transformer.

The electrical precipitator consists commonly of a group of vertical pipes with a wire or rod in the center of each, the pipes being connected to proper headers for the introduction and discharged of the gases. The pipes generally constitute the positive electrodes, and the wires or rods the negative electrodes. The size of the pipes may vary, but in general pipes of less than six inches in diameter are not used. Electrical precipitators with pipes six inches in diameter, using secondary voltages from 35,000 to 50,000 volts, are satisfactory for the purpose of the invention. It is generally best to operate with maximum potential difference (secondary current) between the electrodes, this maximum being just below the break-down voltage at which arcing occurs.

The efficiency of the cleaning is dependent upon several variables. Satisfactory cleaning of the gas may be accomplished if the time of treatment is of the order of one second, although this time may be varied widely depending upon the character of the pitch to be recovered from the gases passing through the precipitator. Working with tubes nine feet long and six inches in diameter, with a gas velocity of from six to four and five-tenths feet per second, an efficiency of cleaning of approximately ninety-nine per cent can be obtained. In the practice of the invention the electrical precipitator may be operated at a suitable temperature to recover pitch of the desired melting point. The temperature of the gases leaving the electrical precipitator is preferably between about 200° and 350° C. The pitch may be returned to the collector main and recovered with the pitch produced therein by the cooling of the gases from their initial temperature of about 700° C. to the temperature required in the operation of the electrical precipitator. The term "pitch" as used throughout the specification and in the claims is intended to refer to those constituents of coal distillation gases which are or may be separated by an electrical precipitator operated in accordance with the present invention and may include tar and other condensable constituents of the gases as well as those materials which are designated "pitch" in the strict sense of the term.

In passing from the electrical precipitator through the cross-over main, the gases are cooled by radiation to a temperature of approximately 180° C., and the heavy oil still carried by the gases is thus condensed and may be withdrawn therefrom. In the continued passage of the gases through the foul gas main, a further reduction in the temperature to about 100° C. is accomplished by radiation, and at the latter temperature the gases are introduced to the primary condenser. At this point the gases, if we assume a coal moisture of five per cent, will have a dew point of approximately 56° C. In the primary condenser the gases are subjected to direct contact with fixed ammonia liquor which is maintained in circulation through the condenser with the addition of sufficient water to make up the loss due to evaporation of about 22 pounds per ton of coal. The gases are thus cooled to a wet bulb temperature of 60° C. The carbolic oil is condensed and withdrawn from the condenser separately from the circulating ammonia liquor, a good separation being effected under the conditions specified. The carbolic oil is conveyed to a suitable receptacle and may be utilized for any desired purpose.

The gases leave the primary condenser and are delivered to the reheater, which is a heat exchanger, to which the heavy oil at about 180° C. is conveyed. The gases are thus reheated to a temperature of about 90° C., and at that temperature are delivered to the saturator. The saturator is supplied with ammonia liquor from the primary condenser at a concentration of about 150 to 200 grams per liter of ammonia and with sulphuric acid in the proportion required to combine with the ammonia. Ammonium sulphate is separated in the saturator and can be recovered therefrom.

From the saturator the gases are passed through an acid separator in which the acid is recovered and returned to the saturator, and they are delivered thence to a final cooler in which the gases are subjected to direct contact with water and their temperature reduced to about 25° C. At this temperature naphthalene is condensed and passes with the water to a decanter in which naphthalene is recovered. The gases then pass through the benzol scrubber where benzol is separated, the gases being adapted then for use as fuel or otherwise.

As hereinbefore indicated, the cooling in the collector main may be effected by heavy oil, the latter being delivered from the reheater to a pump which returns it to the collector main, so that heavy oil circulates continuously in the system, the surplus being collected in any suitable receptacle.

The invention will be more clearly understood by reference to the accompanying drawing, which diagrammatically illustrates an apparatus suitable for use in the practice of the invention, it being understood that details of the structure which are well-known to those skilled in the art are omitted and that the diagram is merely illustrative of the preferred arrangement of the apparatus.

In the drawing, 5 indicates a battery of coke ovens from which gases are conveyed through uptakes 6 to a collector main 7. The latter is supplied by a pipe 8 with heavy oil which serves as a cooling agent to reduce the temperature of the gases and thus to separate heavy pitch constituents therefrom. The gases are delivered by a pipe 9 to an electrical precipitator 10 of any suitable form and construction wherein the gases are subjected at a suitable temperature to an electrical discharge for the purpose of removing further quantities of pitch constituents which are returned through a pipe 11 to the collector main. The pitch which accumulates in the collector main may be withdrawn through a pipe 12.

The gases freed from pitch constituents pass through the cross-over main 13, and the heavy oil which condenses therein is withdrawn through a pipe 14. The gases continue through a foul gas main 15 to the primary condenser 16 wherein they are subjected to concentrated ammonia liquor which is circulated by a pump 17 through pipes 18, 19 and 20. Fresh water is supplied through a pipe 21 to make up the loss due to evaporation. Carbolic oil, which separates in the condenser, is withdrawn through a pipe 22 and is delivered to a receptacle 23.

The gases escape through a pipe 24 and pass through an exhauster 25, which maintains the pressures necessary for circulation of the gases to a pipe 26 which delivers the gases to a reheater 27. The latter is connected to the pipe 14, through which heavy oil is withdrawn from the cross-over main. The heavy oil at relatively high temperature passes through the tubes of the reheater and thus heats the gases which are delivered thereto by the pipe 26. The heavy oil is recirculated by a pump 28 and is returned through a pipe 8 to the collector main. The surplus of the heavy oil is accumulated in a receptacle 29.

The reheated gases pass through a pipe 30 to a saturator 31 which is supplied with concentrated ammonia liquor through a pipe 31' which is connected to the pipe 19. Sulphuric acid is supplied through a pipe 30'. The ammonium sulphate may be removed from the saturator to a receptacle 32, delivered thence to a centrifuge 33, and conveyed to storage space by a conveyor 34.

The gases pass through a pipe 35 to an acid separator 36, the acid being returned by a pipe 37 to the saturator. The gases then pass through a pipe 38 to the final cooler 39 wherein they are subjected to direct contact with water supplied through a pipe 40. The water, which carries naphthalene separated in the condenser, is delivered by pipe 41 to a decanter 42 in which the naphthalene is recovered. The water may be discharged.

The cooled gases are delivered through a pipe 43 to benzol scrubbers 44 and 45 which are connected by a pipe 46. The gases may be delivered through a pipe 47 to a gasometer or other receptacle (not shown).

The condensers, reheater, saturator, and scrubbers are each standard forms of apparatus well known in the art. Similarly the electrical precipitator employed may be the well known form of precipitator which has been utilized heretofore in the separation of tar and pitch constituents from distillation gases. No further and more detailed description of the apparatus is necessary, any of the usual forms of such apparatus being adapted for utilization in the practice of the method.

Various changes may be made in the details of construction and arrangement, therefore, and in the procedure as described, without departing from the invention or sacrificing any of the advantages thereof.

I claim:

1. The process for the recovery of free and fixed ammonia from coal distillation gases which comprises (1) washing the hot gases with heavy oil to remove pitch and heavy oil therefrom; (2) thereafter recirculating aqueous liquor in contact with the pitch and heavy oil-free gas to remove fixed ammonia therefrom; (3) passing the fixed ammonia-, pitch- and heavy oil-free gas through sulphuric acid; and (4) withdrawing excess aqueous liquor containing fixed ammonia from step (2) and introducing it into the sulphuric acid employed in step (3).

2. The process for the recovery of free and fixed ammonia from coal distillation gases which comprises (1) washing the hot gases with heavy oil to remove pitch and heavy oil from the gases; (2) cooling the gas to remove residual heavy oil therefrom; (3) thereafter recirculating aqueous liquor in contact with the pitch and heavy oil-free gas to remove fixed ammonia therefrom and simultaneously cooling the gas; (4) reheating the gas by passing it in heat-exchange relationship with heavy oil from step (2); (5) passing the fixed ammonia-, pitch-and heavy oil-free gas through sulphuric acid; and (6) withdrawing excess aqueous liquor from step (3) and introducing it into the sulphuric acid employed in step (5).

WILLIAM B. WINGERT.